United States Patent [19]

Bambara

[11] 4,292,639
[45] Sep. 29, 1981

[54] QUASI-DOPPLER DIRECTION FINDING EQUIPMENT

[75] Inventor: Joseph E. Bambara, North Babylon, N.Y.

[73] Assignee: Servo Corporation of America, Hicksville, N.Y.

[21] Appl. No.: 103,930

[22] Filed: Dec. 17, 1979

[51] Int. Cl.³ .............................................. G01S 3/54
[52] U.S. Cl. ................................................ 343/113 DE
[58] Field of Search .................................. 343/113 DE

[56] References Cited

FOREIGN PATENT DOCUMENTS 2715383 10/1978 Fed. Rep. of Germany ...... 343/113 DE

*Primary Examiner*—T. H. Tubbesing
*Attorney, Agent, or Firm*—Gerald Levy

[57] ABSTRACT

A quasi-doppler direction finder is provided wherein the alternate dipole elements are divided into two groups. Each of the groups is connected to an associated RF attenuator which is driven by a control signal 180° out-of-phase from that for the other group. Commutation between dipoles occurs so that there is a 50% overlap of "on" time between adjacent dipoles. Switching for each dipole occurs when its associated modulating function passes through zero.

8 Claims, 4 Drawing Figures

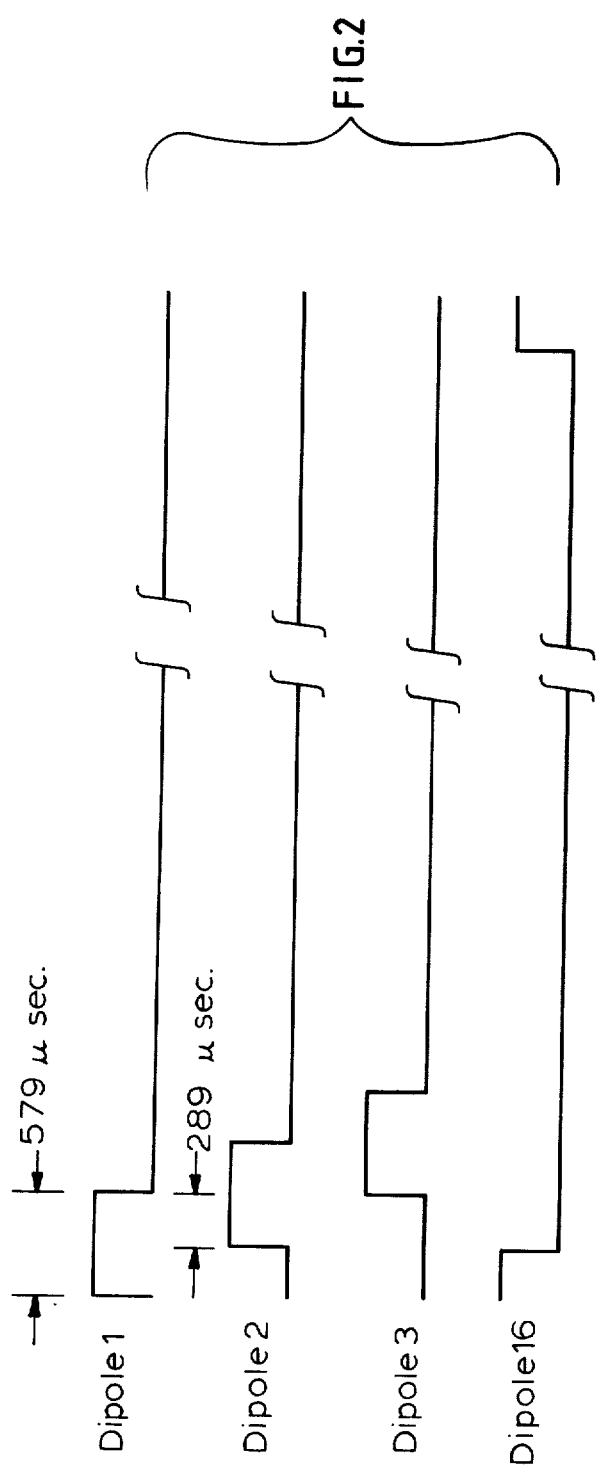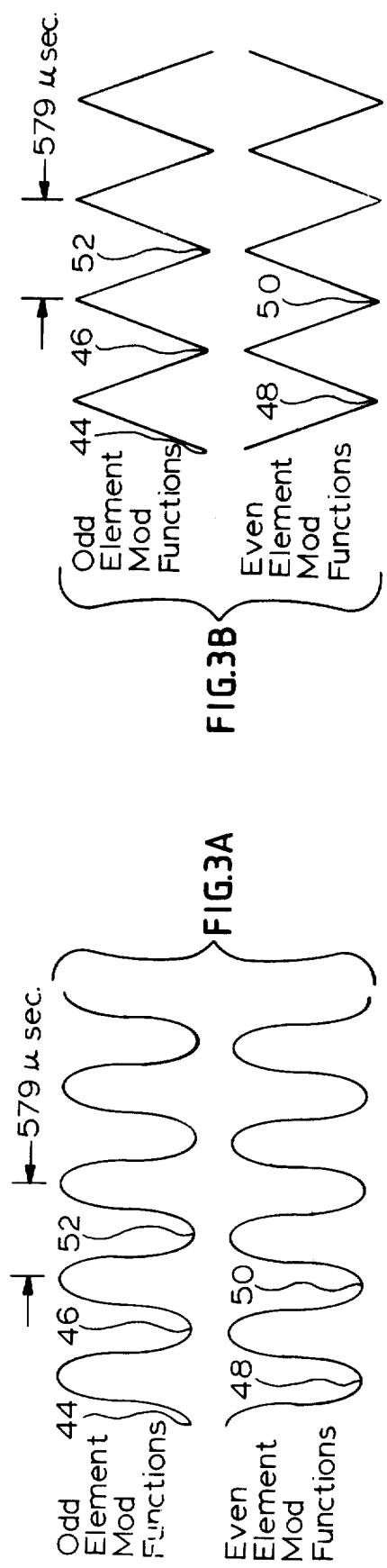

QUASI-DOPPLER DIRECTION FINDING EQUIPMENT

BACKGROUND OF THE INVENTION

The present invention relates to direction finding equipment and in particular to quasi-doppler direction finders especially well suited for maritime purposes.

The portion of the radio band set aside for marine direction finders comprises 155.475 MHz to 162.55 MHz. The allocated band is divided into 284 channels at 25 KHz separation. Accordingly, DF receiver are provided with 25 KHz pass band filters to prov.de separation between adjacent channels.

In a conventional quasi-doppler DF system, a plurality of dipole antenna elements, in a circular array, commonly 16 elements, are sequentially scanned at 216 Hz, 3.456 KHz dipole to dipole. This generates many side bands of received signals and 3.456 KHz that could lie within the 25 KHz pass band of the DF receiver. As a result, the DF receiver is susceptible to generating bearing errors for a desired channel frequency when an off channel frequency exists simultaneously. This may occur, for example, where a land-based transmitter is located close to the DF receiver or several vessels are simultaneously transmitting from locations close to each other.

It has heretofore been determined that the unwanted side bands result from the modulation process which occurs during the switching from dipole element to dipole element. Accordingly, it is heretofore been proposed to blank out the rise and decay time during the successive switching on and off of each dipole element. Although this reduces the susceptibility for generating bearing errors when a desired channel frequency and an off channel frequency exist simultaneously, it has not been found to be extremely satisfactory since side bands are generated at the leading and trailing edges of the blanking pulses. Of course the problem could be entirely avoided by utilizing a single dipole rotating mechanically but such mechanically rotating systems have other inherent problems which make the quasi-doppler system more attractive.

SUMMARY OF THE INVENTION

In view of the above, it is the principal object of the present invention to provide an improved quasi-doppler direction finder system the side bands components of which more closely simulate those of a rotating single element antenna than has heretofore been available.

A further object is to provide a quasi-doppler direction finder in which the side bands components are within 25 KHz.

The above and other beneficial objects and advantages are attained in accordance with the present invention by providing a quasi-doppler direction finder system in which the antenna dipole element are separated into interleaved groups for commutation purposes. The dipole elements are sequentially turned on and then off with overlap of the on-time between adjacent elements. The elements of each group are connected to a voltage controllable RF attenuator which modulates the signals for each group of elements with modulating signals that are out of phase with each other. The outputs of the modulators are connected to a summing device which in turn is connected to a DF receiver.

In a preferred embodiment of the invention, the dipole elements are separated into two groups, conveniently referred to as odd elements and even elements. The modulators for the odd and even elements are 180° out of phase with each other while the period of overlap for adjacent elements was 50% of the on-time. As a result, the switching between elements took place at a time when the modulating function was at a minimum value for the particular dipole being switched on or off while at a maximum value for the adjacent dipole. In this way, the effects of switching are minimized.

BRIEF DESCRIPTION OF THE DRAWINGS

In the accompanying drawings:

FIG. 2 is a time cycle chart setting forth the state of the various antenna dipole elements;

FIG. 3A is a sinisoidial modulating signal wave form; and,

FIG. 3B is a triangular ramp modulating wave form.

DETAILED DESCRIPTION OF THE INVENTION

Figure 1:
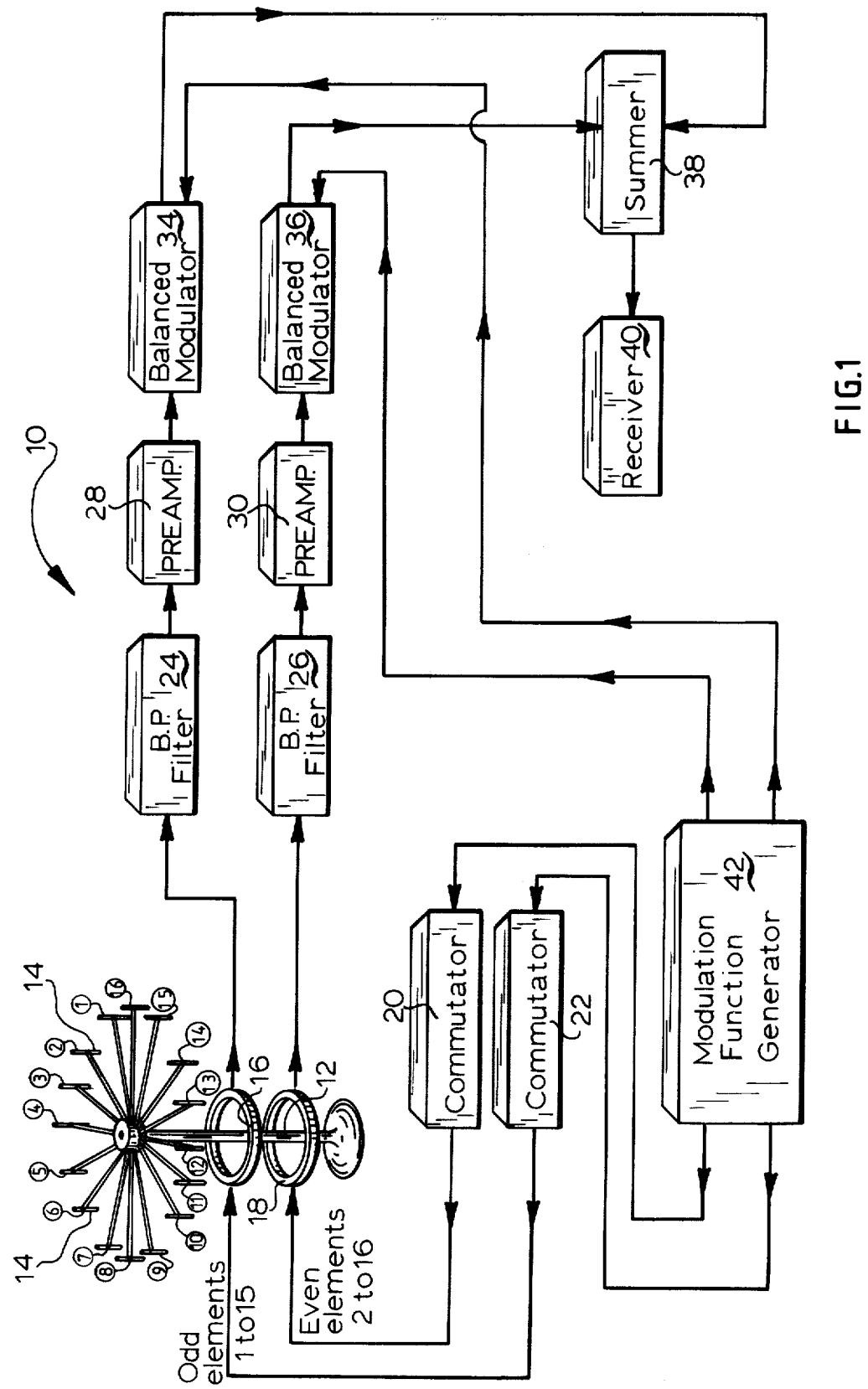
FIG. 1 is a block diagram presentation of a direction finder in accordance with the present invention.

Reference is now made to the drawings and to FIG. 1 in particular wherein a block diagram representation of the present invention is set forth. Direction finder 10 of the present invention comprises a 16 dipole Doppler antenna 12 which is electronically commutated for sequential sampling of received signals. To this end, the dipoles 14 are separated into two groups of 8. The first group generally designated by 16 consists of the odd dipole elements numbered 1, 3, 5 . . . 15; and the second group generally designated by 18 consists of the even dipole elements 2, 4, 6 . . . 16. Electronic commutator means 20 and 22 serve to respectively turn on the odd and even dipoles 16 and 18 in a manner to be discussed forthwith. Each of the dipole groups 16 and 18 is connected to an associated band pass filter 24 and 26 respectively the outputs of which are fed to preamplifiers 28 and 30 respectively the outputs of the preamplifiers are fed to balanced modulators 34 and 36 whose outputs in turn are fed to a summer 38 and then to a receiver 40. The receiver is designed to pick-up the marine frequency range of 155.475 MHz to 162.55 MHz. Such receivers are also commonly designed to pick-up the emergency band of 121.5 MHz. The details of the receiver, which form no part of the present invention, are commonly known as the receiver and may be of the type which automatically searches the frequency range, wherein any channel within the frequency range is selectable manually, or a combination of the two.

The balanced modulators 34 and 36 are controlled by a function generator 42. The function generator also serves to provide timing signals for the commutators 20 and 22 to thereby insure synchronization switching between the groups of elements and the modulated signals.

The drive pulses for commutators 20 and 22 are displaced by one period of 3.456 KHz or 289 microseconds. As shown in FIG. 2, the "on" time for each dipole element is one period of 1.728 KHz or 579 microseconds. As a result, there is an overlap of the "on" time of adjacent dipole elements of 289 microseconds or 50% of the total on-time of any particular dipole.

Balanced modulators 34 and 36 operate as voltage controllable RF attenuators driven by function generator 42. The control signals for modulators 34 and 36 comprise 180° out-of-phase signals which vary in each 289 microsecond interval between 0 and a maximum so that during that same period each balanced modulator 34 and 36 can modulate the RF from zero transmission to maximum transmission. FIG. 3A depicts a first configuration wherein the control signal are sinusoidal to achieve the described modulation. FIG. 3B depicts an alternate configuration wherein the control signals are saw tooth.

From a comparison of FIGS. 2 and 3 it should be noted that a dipole is switched on and off only when its corresponding attenuator is essentially at zero transmission. Thus, dipole 1 is turned on and off at the times indicated by reference numerals 44 and 46 respectively; dipole 2 is turned on and off at the times indicated by reference numerals 48 and 50 respectively; dipole 3 is turned on at the times indicated by reference numerals 46 and 52 respectively and so on. As a result, the spectral side bands created by switching are not passed through to the receiver. Furthermore, between dipole switching intervals the signal received by two dipoles are blended to provide a smooth transmission of phase for the output signal applied to the receiver. This occurs by virtue of the summer 38 adding the signals from the first dipole commutator and the second dipole commutator. Thus, in accordance with the above the aforementioned objects are effectively attained.

Having thus described the invention, what is claimed is:

1. A quasi-doppler direction finder comprising: an antenna having a plurality of elements arranged in circular array, said elements being divided into a plurality of inter-leaved groups;
   means for commutating through each of the elements to sequentially turn said elements on and then off step wise through each group and sequentially between groups with overlap of the on time between adjacent elements;
   a modulation function generator for generating signals to attenuate the signals received by the elements of each group with modulating signals, the modulating signal for each group of elements being out of phase with respect to the modulating signal for each other group of elements;
   a receiver; and
   means for combining the attenuated element signals and feeding the same to said receiver.

2. A direction finder in accordance with claim 1 wherein said antenna elements are divided into two groups and the modulating signals for the groups are 180° out of phase.

3. The direction finder in accordance with claim 2 wherein the modulation function generator includes means for generating sinusoidal modulating signals for the groups.

4. The direction finder in accordance with claim 2 wherein the modulation function generator includes means for generating triangular function modulating signals for the groups.

5. The direction finder in accordance with either of claims 1 or 2, further comprising band pass filter means and preamplifier means for each group of antenna elements interposed between said antenna and said modulating signal generator.

6. The direction finder in accordance with any of claims 1, 2, 3 or 4 wherein said commutating means includes means therein for providing 50% overlap of the on time between adjacent antenna elements.

7. The direction finder in accordance with claim 1 wherein said modulation function generator includes means for generating a modulating signal which passes through zero and said commutating means includes means to turn each of said elements on and off when its modulating signal is passing through zero.

8. The invention in accordance with claim 1 wherein the modulation function generator includes means for generating modulating signals which provide a smooth transition of phase for the output signal applied to the receiver.

* * * * *